US007413719B2

(12) United States Patent
Digdon

(10) Patent No.: US 7,413,719 B2
(45) Date of Patent: Aug. 19, 2008

(54) COMPOSITION AND METHOD FOR OXIDIZING MERCURY IN COMBUSTION PROCESSES

(76) Inventor: William Troy Digdon, 6 Oceanview Dr., Amherst, Nova Scotia (CA) B4H 4M7

( * ) Notice: Subject to any disclaimer, the term of this patent is extended or adjusted under 35 U.S.C. 154(b) by 0 days.

(21) Appl. No.: 11/691,090

(22) Filed: Mar. 26, 2007

(65) Prior Publication Data

US 2007/0212296 A1    Sep. 13, 2007

Related U.S. Application Data

(63) Continuation of application No. PCT/CA2005/001505, filed on Sep. 30, 2005.

(60) Provisional application No. 60/615,285, filed on Oct. 1, 2004.

(51) Int. Cl.
*B01D 53/64* (2006.01)
*F23J 99/00* (2006.01)

(52) U.S. Cl. .................. 423/210; 423/594.18; 431/2

(58) Field of Classification Search .......... 423/210, 423/594.18; 431/2
See application file for complete search history.

(56) References Cited

U.S. PATENT DOCUMENTS

| 5,607,496 | A | 3/1997 | Brooks | 75/670 |
| 5,695,726 | A * | 12/1997 | Lerner | 423/210 |
| 6,284,208 | B1 | 9/2001 | Thomassen | 423/210 |
| 7,048,781 | B1 * | 5/2006 | Lovell | 95/134 |
| 2003/0170159 | A1 | 9/2003 | Honjo et al. | 423/210 |
| 2007/0122327 | A1 * | 5/2007 | Yang et al. | 423/210 |

FOREIGN PATENT DOCUMENTS

| CA | 2 438 867 | 8/2002 |
| CA | 2 477 635 | 9/2003 |

OTHER PUBLICATIONS

Brian K. Gullete et al., "Reduction of Coal-Based Metal Emissions by Furnace Sorbent Injection", Energy & Fuels, vol. 8, pp. 1068-1076 (1994).
D. M. Considine, Van Nostrand's Scientific Encyclopedia, Fifth Edition, pp. 208, Van Nostrand Reinhold Company.
Jongsoo Jurng et al., "Mercury Removal From Incineration Flue Gas By Organic And Inorganic Adsorbents", Chemosphere, vol. 47, pp. 907-913 (2002).
R. Jadhav et al., "Gas Phase Trace Metal Capture Using Sorbents", Seventeenth Annual International Pittsburgh Coal Conference Proceedings, pp. 1-11 (2000).
S. Behrooz Ghorishi et al., "Mercury Speciation in Combustion Systems: Studies with Simulated Flue Gases and Model Fly Ashes", pp. 1-19, U.S. Environmental Protection Agency, National Risk Management Research laboratory, Research Triangle Park.
S.Y. Shiao, "Development Of New Sorbents To Remove Mercury And Selenium From Flue Gas", Ohio Coal Research Consortium, Final Report, pp. 1-21 (1195).

* cited by examiner

*Primary Examiner*—Timothy C Vanoy
(74) *Attorney, Agent, or Firm*—Winston & Strawn LLP

(57) ABSTRACT

The invention can be summarized as follows. There is provided a method for oxidizing elemental mercury in a combustion process comprising, adding a composition comprising an aluminum silicate to a combustion chamber, boiler or kiln downstream from the burner region combustion zone. There is further provided a method for reducing the emission of one or more heavy metals in a combustion process by adding a composition comprising an aluminum silicate to a combustion chamber downstream from the burner region combustion zone. There is also provided a composition comprising an aluminum silicate that may be employed to oxidize elemental mercury generated in a combustion process. The composition also may be employed to reduce the emission of one or more heavy metals generated in a combustion process.

16 Claims, No Drawings

COMPOSITION AND METHOD FOR OXIDIZING MERCURY IN COMBUSTION PROCESSES

CROSS-REFERENCE TO RELATED APPLICATIONS

This application is a continuation of International application No. PCT/CA2005/001505 dated Sep. 30, 2005, which claims the benefit of U.S. provisional application No. 60/615,285 filed Oct. 1, 2004, the entire content of each of which is expressly incorporated herein by reference thereto.

BACKGROUND OF THE INVENTION

The present invention relates to combustion processes. More specifically, the present invention relates to oxidizing elemental mercury in combustion processes.

The combustion of carbonaceous materials in industrial burners, furnaces and boilers often produces combustion products containing various toxic metals. While many toxic metals are produced in an oxidized form that can be condensed to particulate matter by cooling and filtered out by an appropriate filtration system, many toxic metals such as elemental mercury may remain in vapour form on cooling and can be difficult to collect or filter out of typical combustion gas and flue stack emissions. In the United States alone it is estimated that about 87% of the mercury released to the atmosphere is from man-made sources, and that 33% of this is due to coal-fired utility boilers.

A variety of patents have attempted to address the issue of elemental mercury emission from combustion processes by various means. For example, U.S. Pat. No. 5,695,726 and U.S. Pat. No. 5,569,436 disclose the removal of mercury, cadmium and their compounds from incinerator flue gases by contacting the combustion gasses with dry alkaline material and dry activated carbon followed by solids separation with the resulting gas subjected to quench/wet scrubbing with recycle hydrochloric acid solution formed in situ by absorption of HCl from the gas. Unfortunately, the complicated process depends on the presence of sufficient HCl in the waste combustion gases to react with the mercury metals to yield conversion to the metal chlorides. Thus, fuels that contain little or no HCl may be difficult to treat unless expensive and dangerous chemicals are added to the waste.

U.S. Pat. No. 6,719,828 discloses a high-capacity regenerable sorbent for removal of flue gas and processes and systems for making and using the sorbent. A phyllosilicate substrate acts as a support to a thin layer for a polyvalent metal sulfide. The sorbent is prepared by ion exchange between the silicate substrate material and a solution containing one or more polyvalent metals. Unfortunately, the production of such a regenerable solvent is complex and the regeneration of such a sorbent is time consuming.

U.S. Pat. No. 4,889,698 discloses a process for removal of mercury vapour and other noxious compounds in flue gas from an incinerator plant by suspending powdery activated carbon in the flue gas in connection with a conventional spray absorption process in which the acidic components of the flue gas are neutralized by means of basic absorbants. The cooling of the flue gases in the spray absorption process allegedly provides an efficient adsorption onto the powdery activated carbon.

As compared to elemental mercury which can be difficult to capture from combustion processes, oxidized mercury is known to be removed by scrubbers, particularly wet scrubbers. Accordingly, any combustion process that favors the conversion of elemental mercury to oxidized mercury may reduce the amount of mercury emitted into the environment via flue gases.

There is a need in the art for new methods of combusting fuels such that emissions of heavy metals are minimized. Further, there is a need in the art for new combustion methods that oxidize elemental mercury. Further, there is a need in the art for combustion methods that convert elemental mercury to oxidized mercury, such that the oxidized mercury species can be removed by scrubbers, for example wet scrubbers or the like. Further, there is a need for new methods of combusting fuels that are relatively cheap and that can be performed in existing combustion chambers, boilers, kilns or the like. There is also a need in the art for compositions that can be employed in combustion processes to promote conversion of elemental mercury to oxidized mercury.

The present invention now overcomes the disadvantages of the prior art.

SUMMARY OF THE INVENTION

The present invention relates to combustion processes. More specifically, the present invention relates to oxidizing elemental mercury in a combustion process.

According to the present invention, there is provided a method for reducing the emission of heavy metals in a combustion process that comprises adding a composition comprising aluminum silicate, for example, but not limited to smectite clay, bentonite, kaolinite, vermiculite or the like to a combustion chamber, boiler or kiln downstream from the burner region combustion zone.

Also according to the present invention, there is provided a method of oxidizing elemental mercury in a combustion process that comprises adding a composition comprising aluminum silicate as provided above, or a composition comprising an aluminum silicate and a halogen containing compound to a combustion chamber, boiler or kiln downstream from the burner region combustion zone.

In a preferred embodiment, the composition comprising aluminium silicate, for example, smectite clay, bentonite or the like that is employed in the method of the present invention is characterized as comprising a light coloured particulate material, crystalline in structure that is highly swellable and that exhibits high colloidal properties. The composition comprising aluminum silicate preferably comprises one or more, or all of the following characteristics:

$SiO_2$ from about 51 to about 78wt %,
$Al_2O_3$ from about 13 to about 27wt %,
$Fe_2O_3$ from about 2 to about 3wt %,
MgO from about 2 to about 3wt %,
CaO from about 0.1 to about 3wt %,
$Na_2O$ from about 1 to about 3wt %,
$K_2O$ from about 0 to about 2wt %,
TiO from about 0 to about 0.5wt %,
FeO from about 0 to 0.5wt %,
Moisture: less than about 12%;
pH about 8 to about 11 at 5% solids;
Specific Gravity: about 2 to 3;

Exchangeable Metallic Bases:
Sodium: about 60 to about 65 mEq/100 g;
Calcium: about 10 to about 30 mEq/100 g;

Magnesium: about 5 to about 20 mEq/100 g;

Potassium: about 1 to about 5 mEq/100 g;

The compositions may also comprise non-exchangeable ions.

In a further embodiment, which is not meant to be limiting, the present invention contemplates a bentonite comprising one or more of the following characteristics:

$SiO_2$ from about 60% to about 65%;

$Al_2O_3$ from about 18% to about 25%;

$Fe_2O_3$ from about 3% to about 3.5%;

FeO from about 0.3% to about 0.4%;

MgO from about 2.5% to about 2.8%;

$Na_2O$ from about 2% to about 3%;

CaO from about 0.5% to about 0.75%;

Trace from about 0.6% to about 0.8%;

LOI from about 5% to about 6%;

Moisture: less than about 12%;

Dry particle size: between about 0.5% and 2% retained on 30 mesh, about 3% to 30% retained on 40 mesh, maximum about 12% passing 200 mesh.

pH: between about 8 and 11 at 5% solids;

Viscosity between about 6 to 35 cps at 6.25% solids;

It is also contemplated that one or more halogen containing compounds may be added to the composition comprising aluminum silicate, for example, smectite clay, bentonite or the like to produce a composition comprising aluminum silicate and a halogen containing compound. In a preferred embodiment, the halogen containing compound comprises a salt, for example sea salt. In an alternate embodiment, the halogen containing compound is sodium chloride. The halogen containing composition may be present in an amount such that the composition comprises between about 1000 and about 10000 ppm halogen. Without wishing to be bound by theory, it is thought that such salts may aid in the oxidation process, particularly if the fuel, for example, coal or the like has low percentages of these elements. Other variations of bentonite that comprise characteristics different from those listed above may also be employed in the method of the present invention.

Also contemplated by the present invention, the composition comprising aluminum silicate, for example, but not limited to smectite clay, bentonite and the like added to the combustion chamber downstream from the burner region combustion zone may reduce the emission of metals other than mercury from a combustion chamber. For example, but not to be considered limiting in any manner, the composition comprising aluminum silicate may reduce the emission of vanadium, nickel, cadmium, or a combination thereof. Accordingly, the present invention contemplates a method of reducing the emission of one or more metals from a combustion process by adding a composition comprising aluminum silicate to a combustion chamber, boiler or kiln downstream from the burner region combustion zone. In a preferred embodiment, the combustion process comprises a wet scrubber or the like that is capable of removing oxidized mercury compounds, such as, but not limited to mercuric chlorides from the flue gases.

Also provided by the present invention as defined above, the combustion process may employ one or more fuels, for example, but not limited to oil, coal, solid wastes, biomedical wastes, wax, or a combination thereof. Any type of fuel that may release elemental mercury, or other heavy metals or heavy metal-containing compounds may be used by the method of the present invention.

Also provided by the present invention as defined above, the combustion process may comprise one or more combustion chambers, boilers, kilns, afterburners, cyclones, filters, heat exchangers, fabric filters (baghouses), electrostatic precipitators, scrubbers, including wet scrubbers, dry scrubbers and the like, emission stacks or any combination thereof. In a preferred embodiment, the combustion process employs a wet scrubber.

The present invention also contemplates a method as defined above wherein the composition comprising aluminum silicate, such as smectite clay, bentonite or the like is added to the combustion process in a region of the boiler that exhibits a temperature of between about 500° C. and about 1300° C.

The present invention also contemplates a method as defined above wherein the composition comprising aluminum silicate, for example, smectite clay, bentonite or the like is added in a ratio (bentonite:weight of ash in fuel) of from about 0.00001:1 (w/w) to about 1:1 (w/w).

The present invention also contemplates a method as defined above wherein the composition comprising aluminum silicate and a halogen containing compound is added in a ratio (bentonite:weight of ash in fuel) of from about 0.00001:1 (w/w) to about 1:1 (w/w).

In addition, the composition comprising aluminum silicate, such as, but not limited to smectite clay, bentonite or the like that may be employed preferably comprises a particle size in the range passing about 150 to 200 mesh. For example, but not to be limiting, the bentonite may comprise a particle size passing through about 400, 350, 325, 300, 250, 200, 190, 180, 170, 160 or about 150 mesh, or any mesh size there between. Less preferred are particle sizes larger than 150 mesh, for example, but not limited to 50, 60, 70, 80, 90 or 100 mesh, or any mesh size there between. However, particle sizes of 110, 120, 130, 140 mesh, or any mesh size there between may also be employed. Further, the bentonite particle size may be defined by a range of any two of the values listed above.

The present invention also contemplates a composition comprising an aluminum silicate composition and a halogen containing compound having a size as indicated above. Further, the composition may comprise a range of particle sizes defined by any two of the values listed above.

The composition comprising an aluminum silicate composition, such as a smectite clay, bentonite or the like and/or compositions comprising an aluminum silicate composition and a halogen containing compound may be added to a combustion process by any method known in the art. In a preferred embodiment, which is not meant to be limiting, the composition comprising an aluminum silicate and/or composition comprising an aluminum silicate composition and a halogen containing compound is added by pneumatic feed.

This summary of the invention does not necessarily describe all necessary features of the invention but that the invention may also reside in a sub-combination of the described features.

DETAILED DESCRIPTION OF THE PREFERRED EMBODIMENTS

The present invention relates to combustion processes. More specifically, the present invention relates to oxidizing elemental mercury in combustion processes.

The following description is of a preferred embodiment by way of example only and without limitation to the combination of features necessary for carrying the invention into effect.

The present invention provides a method for reducing the emission of heavy metals in a combustion process that comprises adding a composition comprising aluminum silicate to a combustion chamber, boiler or kiln downstream from the burner region combustion zone.

In an alternate embodiment, the present invention provides a method for reducing the emission of elemental mercury in a combustion process that comprises adding a composition comprising aluminum silicate to a combustion chamber, boiler or kiln downstream from the burner region combustion zone.

In an alternate embodiment of the present invention, there is provided a method for converting elemental mercury to oxidized mercury in a combustion process that comprises adding a composition comprising aluminum silicate to a combustion chamber, boiler or kiln downstream from the burner region combustion zone.

By the term "burner region combustion zone" it is meant the volume of space in proximity to the burner flame wherein combustion of a fuel occurs.

By the term "composition comprising aluminum silicate", it is meant a composition comprising aluminum and silicate. Without wishing to be limiting in any manner, the composition comprising aluminum silicate may comprise a smectite clay, such as, but not limited to bentonite or montmorillonite (calcium or sodium or a combination thereof), kaolinite, or an aluminum iron silicate, for example, but not limited to a magnesium-aluminum-iron-silicate including, but not limited to vermiculite, or any combination thereof. In an embodiment which is not meant to be limiting, the composition comprising aluminum silicate comprises a smectite clay. In a further embodiment, the composition is bentonite. In still a further embodiment, the bentonite is a calcium bentonite, a sodium bentonite, or a combination thereof. In a preferred embodiment, the bentonite is a sodium bentonite, more preferably a light coloured sodium bentonite. In still a further embodiment, the composition comprising aluminum silicate comprises vermiculite.

Preferably, the composition comprising aluminum silicate, for example, smectite clay, bentonite or the like is added at one or more regions that permit the material to interact chemically, physically or both with components of the combustion process, for example, but not limited to combustion gases and the like.

In a preferred embodiment, the composition comprising aluminium silicate, for example, smectite clay, bentonite or the like that is employed in the method of the present invention is characterized as comprising a light coloured particulate material, crystalline in structure that is highly swellable and that exhibits high colloidal properties. The composition comprising aluminum silicate preferably comprises one or more, or all of the following characteristics:

$SiO_2$ from about 51 to about 78wt %,
$Al_2O_3$ from 13 to about 27wt %,
$Fe_2O_3$ from about 1 to about 5wt %,
MgO from about 2 to about 3.0wt %,
CaO from about 0.1 to about 3.0wt %,
$Na_2O$ from about 1 to about 3wt %,
$K_2O$ from about 0 to about 2wt %,
TiO from about 0 to about 0.5wt %,
FeO from about 0 to 0.5wt %,
Moisture: less than about 12%
pH about 8 to about 11 at 5% solids
Specific Gravity: about 2 to 3;
Exchangeable Metallic Bases:
Sodium: about 60 to about 65 mEq/100 g
Calcium: about 10 to about 30 mEq/100 g
Magnesium: about 5 to about 20 mEq/100 g
Potassium: about 1 to about 5 mEq/100 g The compositions may also comprise non-exchangeable ions.

Further characteristics of the composition comprising aluminum silicate, particularly bentonites that may be employed in the present invention are provided in Example 2.

In a further embodiment, which is not meant to be limiting, the composition comprising aluminum silicate is a bentonite that comprises one or more, or all of the following characteristics:

$SiO_2$ from about 60% to about 65%;
$Al_2O_3$ from about 18% to about 25%
$Fe_2O_3$ from about 3% to about 3.5%
FeO from about 0.3% to about 0.4%
MgO from about 2.5% to about 2.8%
$Na_2O$ from about 2% to about 3%;
CaO from about 0.5% to about 0.75%;
Trace from about 0.6% to about 0.8%;
LOI from about 5% to about 6%;
Moisture: less than about 12%
Dry particle size: between about 0.5% and 2% retained on 30 mesh, about 3% to 30% retained on 40 mesh, maximum about 12% passing 200 mesh.
pH: between about 8 and 11 at 5% solids;
Viscosity between about 6 to 35 cps at 6.25% solids.

It is also contemplated that one or more halogen containing compounds may be added to the composition comprising aluminum silicate, for example, but not limited to smectite clay, bentonite or the like to produce a composition comprising aluminum silicate and a halogen containing compound. In a preferred embodiment, the halogen containing compound comprises a salt, for example, but not limited to sea salt.

By the term "sea salt" it is meant the salts and other components which exist following evaporation of sea water. There are similarities among sea waters throughout the world. The analysis of sea water may be performed by a person of skill in the art, for example, but not limited to, as described in Sverdrup, Johnson and Fleming (1942, The Oceans pages 176 and 177, which is herein incorporated by reference). As disclosed in U.S. Pat. No. 5,074,901, which is herein incorporated by reference, New York sea water was determined to exhibit similarity with other sea waters, and to have the composition provided in Example 3. Thus, the present invention contemplates using sea salt, including but not limited to sea salt that comprises the composition recited in Example 3. Further, the present invention contemplates using sea salts with compositions that are different in one or all of the components and/or component amounts listed herein. For example, but not wishing to be limiting, the sea salt employed by the present invention may vary by an order of magnitude for any one or all of the components listed. However, it is preferable that the sodium and chloride content vary by less than about 50% of the amount listed. Further, other constituents not listed in the above table may be present in sea salt, for example, but not limited to potassium, or iodine.

In an alternate embodiment, which is not meant to be limiting, the halogen containing compound is sodium chloride. Other halogen containing compounds including non-salt halogen containing compounds are also contemplated.

The halogen containing compound is preferably present in an amount such that the total amount of halogen present in the composition is in the range of about 500 ppm to about 20000 ppm, more preferably about 1000 ppm to about 10000 ppm, or any amount there between. However, the present invention contemplates a halogen content of 500, 750, 1000, 1250, 1500, 1750, 2000, 2500, 3000, 3500, 4000, 4500, 5000, 5500, 6000, 6500, 7000, 7500, 8000, 8500, 9000, 9500, 10000, 11000, 12000, 13000, 14000, 15000, 16000, 17000, 18000, 19000 or 20000 ppm or any amount there between. Further, the halogen content may be defined by a range of any two of the values listed above.

Without wishing to be bound by theory it is thought that halogen containing compounds, such as, but not limited to salts or the like may aid in the oxidation process, particularly if the fuel, for example, coal or the like has low percentages of these elements.

The composition comprising aluminum silicate, for example, but not limited to smectite clay, bentonite, or the like may be employed after manipulation or processing, for example, but not limited to by drying, milling, crushing, sizing, pulverizing, or a combination thereof. The composition comprising aluminum silicate may also be treated or combined with one or more than one additional agents such as, but not limited to acids, soda ash, organic materials, polymers, salts, preferably halogen containing salts, for example, but limited to sodium chloride or the like, or a combination thereof. Specific compounds or chemicals that may be added to or employed in the treatment of the composition comprising aluminum silicate include, but are not limited to sodium chloride, halogen containing compounds, halogen containing salts, alumina ($Al_2O_3$), sodium aluminate, boron oxide, cupric oxide, ferric oxide, manganese dioxide, sodium persulfate, sodium metasilicate, n-aminoethyl ethanolamine, magnesium containing compounds, magnesium acetate, magnesium nitrate, phosphates, alkali metal phosphates, trisodium phosphate, ammonium salts, ammonium chloride, ammonium nitrate, ammonium sulfate, ammonium phosphate, potassium containing compounds, potassium acetate, potassium nitrate, alkali and alkaline earth metal phosphates, alkali and alkaline earth metal carbonates or mixtures thereof. In the event that these chemicals are added, preferably the one or more chemicals comprise less than about 20% by weight of the composition, more preferably less than about 15% of the composition, still more preferably less than about 5% of the composition. However, in separate embodiments that are not meant to be limiting, the composition of the present invention may individually comprise one or more additional components comprising about 0.1%, 1%, 5%, 10%, 15%, 20%, or any value there between of the total weight of the composition comprising aluminum and silicate.

A combustion process requires at least one fuel for combustion. The fuel employed in the combustion process may comprise any fuel that comprises and/or releases elemental mercury following combustion. In a preferred embodiment, which is not meant to be limiting, the fuel is coal, including, but not limited to bituminous, sub-bituminous, lignite coal or a combination thereof. Specific examples of North American coals include, but are not limited to US low sulfur coal, Kentucky coal, Dyenergy coal, Great River Energy coals, Thunder Bay lignite, Saskatchewan lignite, or a combination thereof. However, any coal or mixture of coals from any worldwide geographic region or regions may be used. In addition, it is also contemplated that the method of the present invention may be employed to reduce the emission of heavy metals during the incineration or combustion of oils, solid wastes, biomedical wastes, wax, lignocellulosic materials, wood, black liquor, red liquor or a combination thereof.

It is also contemplated that the fuel may comprise other metals for example, but not limited to heavy metals or the like that may be released following combustion of a fuel. For example, but not to be considered limiting, a fuel may comprise vanadium, nickel, cadmium or a combination thereof. In such cases, the method of the present invention may be employed to reduce the emission of one or more metals from a combustion process.

The composition comprising aluminum silicate, for example, smectite clay, bentonite or the like is added during a combustion process at one or more locations downstream or outside of the burner region combustion zone. In general, a combustion process may be considered a "flowing" system wherein fuel is combusted into a variety of combustion products including hot flue gasses and the like. The combustion products may pass through and optionally interact with one or more additional components of the combustion system, for example, but not limited to one or more afterburners, cyclones, filters, heat exchangers, fabric filters (baghouses), electrostatic precipitators, scrubbers, such as but not limited to dry scrubbers, wet scrubbers, or the like, emission stacks or a combination thereof. Usually, but not always, the temperature of the combustion system is reduced the further away from the main burner region combustion zone the combustion products get. For example, but not to be considered limiting in any manner, an exemplary coal fired boiler may maintain a temperature of about 1500° C. in the burner region combustion zone. It is contemplated that the composition comprising aluminum silicate, such as smectite clay, bentonite or the like is added downstream or after this zone, preferably in a region of the boiler at a temperature of between about 500° C. and about 1300° C., preferably about 600° C. to about 1200° C., more preferably about 700° C. to about 1100° C., more preferably about 1100° C. However, the composition may be added to the combustion process at or about one or more temperatures within the range noted above, for example, but not limited to about 500° C., 550° C., 600° C., 650° C., 700° C., 750° C., 800° C., 850° C., 900° C., 950° C., 1000° C., 1050° C., 1100° C., 1150° C., 1200° C., 1250° C., and 1300° C., or any temperature there between. It is also contemplated that the composition may be added to a combustion process within a temperature range defined any two of the values listed above.

The amount of the composition comprising aluminum silicate, such as smectite clay, bentonite or the like that is added to a combustion process may vary depending on the amount of elemental mercury, or other metal that is capable of being released upon combustion of the fuel, and the amount of chlorine and other halogens contained in the fuel. However, the ratio of the composition comprising aluminum silicate, such as smectite clay, bentonite or the like to the fuel ash content may be from about 0.00001:1 (w/w) to about 1:1 (w/w), more preferably about 0.0001:1 to about 0.5:1, more preferably about 0.001:1 to about 0.25:1. Typically, most fuels comprise an ash content of about 5 to about 25% by weight. In an embodiment of the present invention, which is not to be considered limiting in any manner, the ratio of aluminum silicate composition to coal ash is about 1:1. In an alternate embodiment, the ratio of aluminum silicate composition to coal ash is 0.5:1. However, the present invention contemplates that the ratio of aluminum silicate composition to fuel ash content may be about 0.00001:1, 0.00005:1, 0.0001:1, 0.0005:1, 0.001:1, 0.005:1, 0.01:1, 0.05:1, 0.1:1, 0.5:1, 1:1 or any amount there between. In addition, the present invention contemplates that the ratio of aluminum silicate composition to fuel ash may comprise a range defined by any of the values listed above.

It is also specifically contemplated that the ratio of aluminum silicate composition comprising a halogen containing compound to fuel ash content may be about 0.00001:1, 0.00005:1, 0.0001:1, 0.0005:1, 0.001:1, 0.005:1, 0.01:1, 0.05:1, 0.1:1, 0.5:1,1:1 or any amount therebetween. In addition, the present invention contemplates that the ratio of aluminum silicate composition comprising a halogen containing compound to fuel ash may comprise a range defined by any of the values listed above.

The composition comprising aluminum silicate, for example smectite clay, bentonite or the like may be added to a combustion process by any method known in the art. For example, but not to be considered limiting in any manner, the composition may be fed from a container, hopper or the like via a screw feeder to a pneumatic feed line supplied by a blower or compressor and blown into the boiler at the appropriate location downstream of the burner region combustion zone.

In addition, the aluminum silicate composition preferably comprises a particle size of between about 200 to 325 mesh or higher. For example, but not to be limiting, the aluminum silicate composition may comprise a particle size passing through about 400, 350, 300, 250, 200, 190, 180, 170, 160, about 150 mesh, or any mesh size there between. Less preferred are particle sizes larger than 150 mesh, for example, but not limited to 50, 60, 70, 80, 90 or 100 mesh. However, particle sizes of 110, 120, 130, 140, 150, or any mesh size there between also may be employed. Further, the aluminum silicate composition particle size may be defined by a range of any two of the values listed above. In a preferred embodiment, which is not meant to be limiting, the aluminum silicate composition comprises a particle size passing about 200 mesh. In a further embodiment, the present invention contemplates aluminum silicate composition particle sizes wherein about 75% pass the mesh sizes as defined above. Further, the present invention contemplates aluminum silicate composition particle sizes wherein the mean diameter of the particles are as defined above or a range defined by any two of the values listed above.

Without wishing to be bound by theory, or limiting in any manner, it is thought that the addition of a composition comprising aluminum silicate, for example, smectite clay, bentonite or the like to a combustion process at a region downstream from the burner region combustion zone enhances the conversion of elemental mercury to oxidized mercury in the combusted fuel. As it is known in the art that gas phase oxidized mercury-containing compounds, such as, but not limited to mercuric chlorides may be removed from combustion gases by a variety of components and processes, such as wet scrubbing systems or by adsorption on high surface area sorbents, such as activated carbon, any process that reduces the production of elemental mercury, for example by shifting the equilibrium of elemental mercury to oxidized mercury may provide significant benefits to the environment and enhance the value of the combustion process. However, ash produced using aluminum silicate such as bentonite can be used as an additive in cements whereas ash produced using activated carbon cannot readily be used in such ways.

As described in Example 1, control combustion of US low sulfur coal ash showed that about 64.9% of the mercury was in the oxidized form whereas about 35.1% was found as elemental mercury. In two separate trials, injection of bentonite immediately after the burner region of the combustion zone resulted in about 69.9% oxidized Hg and about 30.1% elemental mercury and about 67.1% oxidized Hg and about 32.9% elemental mercury. However, when bentonite was injected into a lower temperature zone downstream from the burner region of the combustion zone in a ratio of about 1:1 bentonite to coal ash, the amount of oxidized mercury was found to be about 78.2% and elemental mercury to be about 21.8%. A similar trial using bentonite characterized as having particle sizes of 75% passing 200 mesh yielded about 87.7% oxidized Hg and about 12.3% elemental Hg. Further, when the injection ratio of bentonite to coal ash was changed from 1:1 to about 0.5:1 and the bentonite was injected into a lower temperature zone downstream of the burner region combustion zone, the percentage of oxidized Hg was determined to be about 92.4% and the percentage of elemental Hg was determined to be about 7.6%. Collectively, these results and the additional results described herein suggest that the ratio of elemental to oxidized mercury may be affected by 1) the addition of a composition comprising aluminium silicate, for example smectite clay, bentonite or the like to the combustion process; 2) The location that the aluminum silicate composition is added in the combustion process and 3) The size of the aluminum silicate composition particles employed in the combustion process.

Also contemplated by the present invention, the composition comprising aluminum silicate, such as, but not limited to smectite clay, bentonite or the like added to the combustion chamber downstream from the burner region combustion zone may reduce the emission of metals other than mercury from a combustion chamber. For example, but not to be considered limiting in any manner, the aluminum silicate composition may reduce the emission of vanadium, nickel, cadmium, or a combination thereof.

In the course of tests employing oil as fuel and injection of bentonite to the burner region combustion zone, it was observed that there was a large accumulation of slagged and sintered ash in the bottom of the furnace, comprised mostly of silica and alumina, but also comprised of heavy metals such as, but not limited to vanadium and nickel. The amount of nickel in the ash deposits at the bottom of the furnace was greater when bentonite was added as compared to when bentonite was not added to the combustion process. Without wishing to be limiting, or bound by theory in any manner, as the amount of nickel in bentonite cannot account for the amount observed in ash found in the bottom of the furnace, the addition of bentonite downstream of the combustion zone may cause nickel or nickel-containing compounds to undergo one or more reactions that result in their precipitation, whereas if bentonite is not employed in the combustion process, much of the nickel escapes as fume.

The present invention also contemplates a method for reducing the emission of one or more heavy metals in a combustion process comprising, combusting a fuel source in the presence of a first composition comprising aluminum silicate, for example, smectite clay, bentonite, or the like, the combusting occurring in a combustion chamber, boiler or kiln at or near the burner region combustion zone and;

adding a second composition comprising aluminum silicate, such as smectite clay, bentonite or the like to the combustion chamber, boiler or kiln downstream from the burner region combustion zone.

Without wishing to be considered limiting in any manner and for the sole purpose of differentiating between the addition of the composition comprising aluminum silicate at two different locations in a combustion process, the step of combusting a fuel source in the presence of a first composition comprising aluminum silicate may be considered to occur "upstream" of a step of adding a second composition comprising aluminum silicate to the combustion chamber, boiler or kiln downstream of the boiler region. As such, this particular step of combusting in the presence of a composition comprising aluminum silicate may be referred to herein as "upstream addition". Conversely, the step of adding a composition comprising aluminum silicate to the combustion chamber, boiler or kiln downstream of the boiler region may be referred to herein as "downstream addition". It is preferable that the composition comprising aluminum silicate employed in the upstream addition does not also comprise a composition comprising a halogen as provided herein. Without wishing to be bound by theory, the halogens contained in such a composition may promote corrosion of the interior of the combustion chamber, furnace and other components.

It is contemplated that the first composition comprising aluminum silicate may be the same or different from second composition comprising aluminum silicate. For example, but not to be limiting in any manner, the first and second compositions may differ in the amount added to the combustion chamber, boiler, kiln or the like, the size of the composition, the method in which it is delivered to the combustion chamber, the specific components therein, or any combination thereof. As a result of the combustion process, the addition of the first composition (i.e. the "upstream addition of the composition comprising aluminum silicate") usually takes places at a region of higher temperature as compared to the second composition (i.e. the "downstream addition of the composition comprising aluminum silicate"). As an example, but without wishing to be limiting in any manner, the upstream addition may occur in a region of the boiler comprising a temperature of about 1500° C., whereas the "downstream addition" may occur in a region of the boiler comprising a temperature of about 1000° C.

The present invention also contemplates a combustion process wherein the composition comprising aluminum silicate, for example, smectite clay, bentonite or the like is added to the burner region combustion zone and also downstream of the burner region combustion zone as described above. The methods of the present invention may be employed for example, but not limited to in coal-fired utility boilers, medical waste incinerators, pulp and paper plants, textile plants, power mills, oriented strand board mills, oil and gas refineries, and the like.

In respect of an embodiment that employs the upstream addition of a composition comprising an aluminum silicate, for example, smectite clay, bentonite or the like, it is also contemplated that the composition may be added to any suitable fuel prior to combustion of the fuel or it may be added to the combustion chamber during the combustion process. In this latter embodiment, the composition may be added by direct feed prior to entering the combustion zone, directly to the combustion zone, in combination with oxygen or air that is employed with the combustion process, or any combination thereof. In some cases, it may be desired to add the composition comprising aluminum silicate, such as smectite clay, bentonite, or the like to the combustion flame itself. The composition may be fed into the combustion chamber by any means known in the art, for example, but not limited to screw auger, venturi tube, blown into boiler or any combination thereof. In separate embodiments, the composition may be delivered by a continuous feed system, batch transfer system or a combination of both.

In an embodiment of the present invention wherein upstream addition of a composition comprising aluminum silicate, for example, but not limited to smectite clay, bentonite or the like is employed in a combustion process, preferably it is used in an amount of about 0.001% to about 50% (w/w) of the ash weight of the combustion fuel. The present invention also contemplates employing a composition comprising aluminum silicate comprising about 0.005%, 0.01%, 0.05%, 0.1%, 0.15%, 0.2%,0.25%, 0.5%, 0.75%, 1%, 2%,3%,5%, 10%, 20% (w/w) of the ash weight, or any percentage there between. The present invention also contemplates a range defined by any of the values listed herein. In an alternate embodiment, the present invention contemplates a range as defined previously for the addition of the aluminum silicate composition downstream from the burner region combustion zone.

The above description is not intended to limit the claimed invention in any manner, furthermore, the discussed combination of features might not be absolutely necessary for the inventive solution.

The present invention will be further illustrated in the following examples. However it is to be understood that these examples are for illustrative purposes only, and should not be used to limit the scope of the present invention in any manner.

EXAMPLES

Example 1

Results of Employing Downstream Addition of Bentonite in Various Combustion Processes The effect of downstream addition of bentonite on combustion processes was tested in a pilot scale research burner. The tests were performed using a 1:1 injection ratio of bentonite to coal ash. The coal was US low sulfur which is bituminous coal comprising a high chlorine content of about 2000 ppm. All samples assayed for mercury were obtained after the electrostatic precipitator (ESP). The size of the bentonite particles for treatments 1-4 listed below passed about 50 mesh and exhibited an average particle size passing about 90 mesh. For treatment 5 listed below, about 75% of the particles passed 200 mesh.

| Treatment | % oxidized Hg | % elemental Hg |
| --- | --- | --- |
| 1. Control US low sulfur coal ash Combustion (no bentonite) | 64.9 | 35.1 |
| 2. As per 1 except bentonite injected between burners in burner zone | 67.1 | 32.9 |
| 3. As per 1 except bentonite injected immediately after burners | 69.9 | 30.1 |
| 4. As per 1 except bentonite injected in low temperature region downstream from burners (bentonite particles were about 90 mesh) | 78.2 | 21.8 |
| 5. As per 1 except bentonite injected in low temperature region downstream from burners (about 75% of the bentonite particles passed 200 mesh) | 87.7 | 12.3 |

The results suggest that the addition of an aluminum silicate composition downstream of the burner region reduces the % amount of elemental mercury produced in the combustion process. The results also suggest that smaller particles of a composition comprising aluminum silicate provide a greater % reduction in the amount of elemental mercury produced in the combustion process.

The effect of downstream addition of bentonite to combustion processes was further tested. The tests were performed using a 0.5:1 injection ratio of bentonite to coal ash. All samples assayed for mercury were obtained after the electrostatic precipitator (ESP). The bentonite particles exhibited a size wherein about 75% pass 200 mesh.

| Treatment | % oxidized Hg | % elemental Hg |
|---|---|---|
| 1. Control US low sulfur coal ash Combustion (no bentonite) | 64.9 | 35.1 |
| 2. As per 1 except bentonite injected downstream from burners | 92.4 | 7.6 |

The results suggest that the addition of an aluminum silicate composition downstream of the burner region reduces the % amount of elemental mercury produced in the combustion process.

The effect of bentonite plus sea salt addition (to produce an equivalent total chlorine of about 2000 ppm in the fuel) into the burner region versus downstream from burner region for Thunder Bay lignite coal was tested. All samples assayed for mercury were obtained after the baghouse.

| Treatment | % oxidized Hg | % elemental Hg |
|---|---|---|
| 1. Control combustion (no bentonite + salt) | 24.7 | 75.3 |
| 2. Control combustion (no bentonite + salt) | 27.6 | 72.4 |
| 3. Combustion with bentonite + salt at burner region | 28.6 | 71.4 |
| 4. Combustion with bentonite + salt at low temperature zone downstream from burner region. | 37.9 | 62.1 |

A combustion process with bentonite but without salt showed a lesser effect than that of bentonite plus salt.

The results suggest that the addition of an aluminum silicate composition plus a halogen containing compound downstream of the burner region reduces the % amount of elemental mercury produced in the combustion process.

The effect of bentonite injection into the burner region combustion zone versus simultaneous addition at the burner region combustion zone and downstream of the burner region combustion zone for bituminous Kentucky coal was tested. All samples assayed for mercury were obtained after ESP.

| Treatment | % oxidized Hg | % elemental Hg |
|---|---|---|
| 1. Control combustion (no bentonite) | 79.9 | 20.1 |
| 2. Combustion with bentonite at burner region | 58.4 | 41.6 |
| 3. Combustion with bentonite at burner region and simultaneous addition downstream from burner region | 92.3 | 7.7 |

The results suggest that the simultaneous addition of an aluminum silicate composition at the burner region and downstream of the burner region reduces the % amount of elemental mercury produced in the combustion process by an amount greater than a combustion process which employs similar conditions but where the aluminum silicate composition is added at the burner region only.

The effect of bentonite injection into the burner region combustion zone versus simultaneous addition at the burner region combustion zone and downstream of the burner region combustion zone for Kentucky coal. All sample assayed for mercury were obtained after the baghouse.

| Treatment | % oxidized Hg | % elemental Hg |
|---|---|---|
| 1. Control combustion (no bentonite) | 90.6 | 9.4 |
| 2. Combustion with bentonite at burner region | 84.5 | 15.5 |
| 3. Combustion with bentonite at burner region and simultaneous addition downstream from burner region | 98.4 | 1.6 |

The results suggest that the simultaneous addition of an aluminum silicate composition at the burner region and downstream of the burner region reduces the % amount of elemental mercury produced in the combustion process by an amount greater than a combustion process which employs similar conditions but where the aluminum silicate composition is added at the burner region only.

Example 2

Characteristics of Bentonite

Bentonite may be characterized as comprising one or more or all of the following characteristics:
$SiO_2$ from about 51 to about 78wt %,
$Al_2O_3$ from about 13 to about 23wt %,
$Fe_2O_3$ from about 1 to about 5wt %,
MgO from about 2 to about 3wt %,
CaO from about 0.1 to about 3.0wt %,
$Na_2O$ from about 1 to about 3wt %,
$K_2O$ from about 0 to about 2wt %,
TiO from about 0 to about 0.5wt %,
FeO from about 0 to about 0.5wt %,
Moisture: less than about 12%
pH about 8 to about 11 at 5% solids
Specific Gravity: about 2 to 3;
Exchangeable Metallic Bases:
Sodium: about 60 to about 65 mEq/100 g
Calcium: about 10 to about 30 mEq/100 g
Magnesium: about 5 to about 20 mEq/100 g
Potassium: about 1 to about 5 mEq/100 g The compositions may also comprise non-exchangeable ions.
"Cation exchange capacity" may be determined using ASTM standard test method #C 837-81 for Methylene Blue Index of Clay. In some cases, the exchangeable metallic bases may be determined by leaching with ammonium acetate. "Percentage fines" may be determined by dry sieve analysis as a percentage through a particular mesh size. "Thermal durability" is often used for evaluating foundry usage of products and involves heating a sample of material to 540° C. and re-measuring the cation exchange capacity of the material. The thermal durability is then calculated as the percentage of clay activity retained compared to the initial measurement.

The bentonite employed by the present invention is light in color, for example, but not limited to yellow or yellow-white and is highly swellable. By "swellable" or "high swellability" it is meant that the bentonite, when tested under conditions known in the art, exhibit the property of swell (swell index or volumetric swell) of at least 15 ml, or from about 20 to about 50 ml, and preferably greater than about 20 ml, and more preferably greater than about 25 ml. Swelling may be determined as the percentage volume increment of 2.5 g of bentonite in 100 ml of water calculated to 100 g.

In an alternate embodiment, which are not meant to be limiting in any manner, the bentonite that may be employed by the present invention may comprise the following characteristics:

| Test | Specification |
|---|---|
| Moisture | from about 6 to about 13% maximum |
| Viscosity | about 180 bbl. Untreated |
| Sieve | from about 0.7 to about 1.2% on 30 mesh |
| Sieve | about 8 to about 25% on 40 mesh |
| Sieve | about 15% max through 200 mesh |
| Free Swell | about 20 to about 50 ml |
| Brightness | about 50 to about 70 GE units |
| Waterplate | about 400 to about 900. |

The following characteristics provided below were obtained from compositions varying from that of bentonite. However, the variant compositions may be employed in the method of the present invention as defined herein bentonite as described herein and as characterized in Example 2, and variant compositions as defined below may be employed for the downstream addition of bentonite in combustion processes. However, it is preferred that only bentonite compositions defined by Example 2 be used in the upstream addition of bentonite to a combustion process. In a further embodiment, which is not meant to be limiting in any manner, the downstream addition of bentonite may employ bentonite as characterized as in Example 2.

Variant Bentonite Composition 1
Colour: light colored;
Average size: less than 200 mesh

| Component | Weight % |
|---|---|
| $SiO_2$: | about 75% |
| $Al_2O_3$: | about 15% |
| $Fe_2O_3$: | about 2% |
| MgO: | about 3% |
| CaO: | about 2% |
| $Na_2O$: | about 1% |
| $K_2O$: | about 1% |

Moisture: less than about 12%
Specific Gravity: about 2.6
Particle size: about 70% minimum passing 200 mesh
pH about 8 to about 11 at 5% solids Variant Bentonite Composition 2

| Component | Weight % |
|---|---|
| $SiO_2$: | about 63% |
| $Al_2O_3$: | about 21% |
| $Fe_2O_3$: | about 3% |
| FeO: | about 0.4% |
| MgO: | about 3% |
| CaO: | about 1% |
| $Na_2O$: | about 3% |
| LOI: | about 5 |

Moisture: less than about 12%
Specific Gravity: about 2.6
Bulk density: 58-65 lbs/cu.ft.
Particle size: about 20% max retained on 40 mesh; about 12% max passing 200 mesh
pH about 8 to about 11 at 5% solids
Exchangeable Metallic Bases:

Sodium: preferably about 60 to about 65 mEq/100 g
Calcium: preferably about 10 to about 30 mEq/100 g -continued Variant Bentonite Composition 2

| Component | Weight % |
|---|---|

Magnesium: preferably about 5 to about 20 mEq/100 g
Potassium: preferably about 1 to about 5 mEq/100 g Variant Bentonite Composition 3

| Component | Weight % |
|---|---|
| $SiO_2$ | from about 58 to about 64% |
| $Al_2O_3$ | from about 18 to about 21% |
| $Fe_2O_3$ | from about 2.5 to about 2.8% |
| MgO | from about 2.5 to about 3.2% |
| CaO | from about 0.1 to about 1.0% |
| $Na_2O$ | from about 1.5 to about 2.7% |
| $K_2O$ | from about 0.2 to about 0.4% |
| FeO | from about 0.2 to about 0.4% |
| $TiO_2$ | from about 0.1 to about 0.2% |

Minor constituents from about 0.5 to about 0.8%
Chemically held water about 5.64%
Mechanically held Water about 0.00%
Particle size (dispersed in water):

About 96 to 97% <44 microns
About 93 to 94% <5 microns
About 87 to 89% <0.5 microns
About 60 to 65% <0.1 microns
Specific Gravity: about 2.7
pH of water suspensions: about 8 to about 10
Exchangeable Metallic Bases:

Sodium: about 60 to about 65 mEq/100 g
Calcium: about 15 to about 20 mEq/100 g
Magnesium: about 5 to about 10 mEq/100 g
Potassium: about 1 to about 5 mEq/100 g
Total After Correction for Sulfates (non exchangeable ions) about 85 to about 90 mEq/100 g Variant Bentonite Composition 4

| Component | Weight % |
|---|---|
| $SiO_2$: | about 66% |
| $Al_2O_3$: | about 18% |
| $Fe_2O_3$: | about 4% |
| MgO: | about 2% |
| CaO: | about 1% |
| $Na_2O$: | about 2% |
| $K_2O$: | about 0.3% |
| FeO: | about 0.2% |
| $TiO_2$: | about 0.2% |

Loss on ignition (LOI): about 5%
Moisture: about 7 to 9%
Particle Size: about 80 to 90% passing 200 mesh
Swelling: about 650 to about 850 in units calculated to 100 g from 2.5 g/100 ml
Cation exchange capacity: about 80 to about 90 meq/100 g based on methylene blue titration
Specific Gravity: about 2.5
Bulk density: about 800 kg/m3.

Variant Bentonite Compositions 5 and 6

| Test | Specification |
|---|---|
| Moisture | about 12% maximum |
| Viscosity | about 180 bbl. Untreated |
| Sieve | about 1% max on 30 mesh |

-continued

Variant Bentonite Compositions 5 and 6

| Test | Specification |
| --- | --- |
| Sieve | about 10 to about 20% on 40 mesh |
| Sieve | about 12% max through 200 mesh |
| Free Swell | about 27 ml minimum |
| Brightness | about 55 to about 65 GE units |
| Waterplate | about 500 to about 800 |

Variant Bentonite Composition 7

| Test | Specification |
| --- | --- |
| Moisture | about 8.3 |
| Viscosity | about 10.5 |
| Sieve | about 0.9 max on 30 mesh |
| Sieve | about 10.2 on 40 mesh |
| Sieve | about 5.6 max through 200 mesh |
| Free Swell | about 27 |
| Brightness | about 63 GE units |
| Waterplate | about 620 |

Variant Bentonite Composition 8

| Test | Specification |
| --- | --- |
| Moisture | about 12% maximum |
| Viscosity | about 180 bbl. Untreated |
| Sieve | about 20% max on 8 mesh |
| Sieve | about 20 max passing 20 mesh |
| Free Swell | about 27 ml minimum |
| Brightness | about 55 to about 65 GE units |
| Waterplate | about 500 to about 800 |

Variant Bentonite Composition 9:

| Test | Specification |
| --- | --- |
| Moisture | about 7.6% |
| Viscosity | about 10.5 |
| Sieve | about 0.9 maximum passing 8 mesh |
| Sieve | about 4.0 maximum passing 20 mesh |
| Free Swell | about 32 ml |
| Brightness | about 61 GE units |
| Waterplate | about 766 |

Variant Bentonite Composition 10

| | |
| --- | --- |
| $SiO_2$ | from about 60% to about 65%; |
| $Al_2O_3$ | from about 18% to about 25% |
| $Fe_2O_3$ | from about 3% to about 3.5% |
| FeO | from about 0.3% to about 0.4% |
| MgO | from about 2.5% to about 2.8% |
| $Na_2O$ | from about 2% to about 3% |
| CaO | from about 0.5% to about 0.75%; |

Trace from about 0.6% to about 0.8%;
LOI from about 5% to about 6%;
Moisture: less than about 12%
Dry particle size: between about 0.5% and 2% retained on 30 mesh, about 3% to 30% retained on 40 mesh, maximum about 12% passing 200 mesh.
PH: between about 8 and 11 at 5% solids
Viscosity between about 6 to 35 cps at 6.25% solids.

Example 3

Composition of Sea Water

TABLE 1

Composition of Sea Water

| Component | ppm (mg/l) |
| --- | --- |
| nitrate | <1 |
| sodium | 2141.69 |
| aluminum | 0.21 |
| cadmium | <0.01 |
| chromium total | 0.02 |
| chromium hexavalent | <0.01 |
| copper | 0.31 |
| iron | 0.37 |
| nickel | 0.02 |
| lead | 0.05 |
| silver | 0.19 |
| zinc | <0.01 |
| manganese | 0.05 |
| chloride | 2373.2 |
| sulfate | 4.11 |
| fluoride | 0.26 |
| calcium | 6.45 |
| barium | 0.07 |
| magnesium | 1.69 |
| ammonia | 0.15 |

The entire content of each document mentioned herein is expressly incorporated by reference.

The present invention has been described with regard to preferred embodiments. However, it will be obvious to persons skilled in the art that a number of variations and modifications can be made without departing from the scope of the invention as described herein.

What is claimed is:

1. A method for converting elemental mercury to oxidized mercury in a combustion process that comprises,
    adding a composition comprising bentonite to a combustion chamber, boiler or kiln downstream from the burner region combustion zone at a temperature greater than about 500° C.

2. The method of claim 1, wherein said bentonite comprises a sodium bentonite.

3. The method of claim 2, wherein said sodium bentonite has a crystalline structure that is swellable and that exhibits colloidal properties.

4. The method of claim 3, wherein said bentonite further comprises one or more of the following characteristics:
    $SiO_2$ from about 51 to about 78wt %,
    $Al_2O_3$ from about 13 to about 23wt %,
    $Fe_2O_3$ from about 1 to about 5wt %,
    MgO from about 2 to about 3wt %,
    CaO from about 0.1 to 3.0wt %,
    $Na_2O$ from about 1 to about 3wt %,
    $K_2O$ from about 0 to about 2wt %,
    TiO from about 0 to about 0.5wt %,
    FeO from about 0 to 0.5wt %;
    Moisture: less than about 12%;
    pH about 8 to about 11 at 5% solids;
    Specific Gravity: about 2 to 3;
    Sodium: about 60 to about 65 mEq/100 g;
    Calcium: about 10 to about 30 mEq/100 g;
    Magnesium: about 5 to about 20 mEq/100 g; or
    Potassium: about 1 to about 5 mEq/100 g.

5. The method of claim 4, wherein said bentonite additionally comprises one or more of the following characteristics:

Viscosity about 180bbl. Untreated;
Sieve about 20% max on 8 mesh;
Sieve about 20% max passing 20 mesh;
Free Swell about 27 ml minimum;
Brightness about 55 to about 65 GE units; or
Waterplate about 500 to about 800.

6. The method of claim 1, wherein said combustion process comprises one or more fuels selected from the group consisting of oil, coal, solid wastes, biomedical wastes, wax, lignocellulosic material, wood, black liquor, red liquor or a combination thereof.

7. The method of claim 6, wherein the fuel employed in the combustion process is coal.

8. The method of claim 1, wherein downstream of said burner region combustion zone are one or more afterburners, cyclones, filters, heat exchangers, fabric filters, baghouses, electrostatic precipitators, wet scrubbers, emission stacks or a combination thereof.

9. The method of claim 8, wherein downstream of the burner region combustion zone is one or more wet scrubbers.

10. The method of claim 1, wherein said composition comprising bentonite is added to the combustion process in a region of the boiler that exhibits a temperature of between about 500° C. and about 1300° C.

11. The method of claim 1, wherein said composition comprising bentonite is added at a ratio (bentonite: fuel ash content) of from about 0.00001:1 (w/w) to about 1:1 (w/w).

12. The method of claim 1, wherein said composition comprising bentonite comprises a particle size in the range of about 90 mesh to about 400 mesh.

13. The method of claim 1, wherein the bentonite is blown into the combustion chamber, boiler or kiln downstream from the burner region combustion zone.

14. The method of claim 1 further comprising a step of adding a composition comprising bentonite to the combustion chamber, boiler or kiln upstream or at the burner region combustion zone, wherein the upstream and downstream additions of bentonites occur simultaneously.

15. The method of claim 14, wherein said bentonites are sodium bentonites.

16. The method of claim 15, wherein the bentonites are different.

* * * * *